United States Patent [19]
Ayres

[11] 3,885,608
[45] May 27, 1975

[54] FLUID COUPLING APPARATUS
[76] Inventor: David B. Ayres, 4633 West M-12, Quartz Hill, Calif. 93534
[22] Filed: Feb. 2, 1973
[21] Appl. No.: 329,004

[52] U.S. Cl. .............. 141/354; 137/383; 251/149.6
[51] Int. Cl. ............................................. B65b 3/04
[58] Field of Search ............ 137/383, 798; 141/193, 141/194, 198, 200, 207, 208, 251, 263, 281, 141/291, 292, 296, 346, 347, 349, 351–356, 141/360, 383, 386, 292, 294, 301, 302, 361, 141/362, 382, 392; 222/153; 51/149.1, 251/149.6, 149.7, 149.8

[56] References Cited
UNITED STATES PATENTS

| | | | |
|---|---|---|---|
| 2,307,427 | 1/1943 | Smith et al. | 141/199 X |
| 3,086,565 | 4/1963 | Mosher | 141/347 |
| 3,171,448 | 3/1965 | Fromm | 141/346 X |
| 3,291,152 | 12/1966 | Comer | 141/347 X |
| 3,513,887 | 5/1970 | Limandri | 141/346 X |

Primary Examiner—Richard G. Aegerter
Assistant Examiner—Frederick R. Schmidt
Attorney, Agent, or Firm—Nilsson, Robbins, Bissell, Dalgarn & Berliner

[57] ABSTRACT

A fluid coupling apparatus is disclosed, as to include mating male and female members. The male member includes an annular seal as disclosed herein, for closure with the female member to afford a flow passage. A valve is affixed within the annular seal to prevent the escape of fluid when the members are disengaged. A sequence mechanism in the male member is actuated upon forceful engagement with the female member and is thereby variously displaced to control the valve so that it may not be opened until the seal is engaged. Other structural components of the described embodiments include spring means for actuating the sequence mechanism, a venting passage as to allow the escape of air from a tank being filled through the coupling and an automatic disengaging structure controlled by a pressure sensor.

4 Claims, 4 Drawing Figures

FLUID COUPLING APPARATUS

BACKGROUND AND SUMMARY OF THE INVENTION

This invention is related to the present inventor's co-pending case entitled FLUID CONNECTION APPARATUS INCORPORATING CONTROL VALVE, Ser. No. 175,301.

The need frequently arises for establishing a temporary fluid-flow coupling between two chambers. For example, in the distribution of gasoline and other liquid fuels, several fluid transfers usually occur. Specifically, gasoline produced at a refinery may be transferred from storage tanks to bulk distribution locations. From each such locations, the fuel may then be transported to service stations at which it is finally dispensed into vehicle tanks for consumption. Conventionally, at least the final transfer, and in some instances several others, involve an open coupling in the transfer passage with the result that gas fumes are vented directly from the receiving tank, carrying live hydrocarbons into the atmosphere. The vast amount of fuel that is so transferred in industrialized areas results in substantial contamination of the air. Consequently, a need exists for an economical, effective and practical coupling for providing a closed passage between fuel tanks.

In general, the structure disclosed in applicant's above-referenced related case provides a coupling for effectively accomplishing a closed fluid passage. Generally, the present invention constitutes an improvement affording several distinct advantages. Specifically, the structure of the present invention affords a venting passage without the necessity of indexing or alignment between male and female components of the coupling. Additionally, the structure of the present invention affords a large passage through the coupling in relation to the length of the valve therein. Embodiments of the present invention also may be constructed for use with exceedingly-simple receptacle (female member) ports. Accordingly, although various other applications will be readily apparent, the present system is well suited to use in transferring gasoline and other liquid fuels from one tank to another.

BRIEF DESCRIPTION OF THE DRAWING

In the drawing, which constitutes a part of this specification, an exemplary embodiment exhibiting various objectives and features hereof is set forth, specifically.

DESCRIPTION OF THE ILLUSTRATIVE EMBODIMENTS

As required, detailed illustrative embodiments of the invention are disclosed herein. The embodiments exemplify the invention which may, of course, be embodied in other forms, some of which may be radically different from the illustrative embodiments. However, the specific structural and functional details disclosed herein are representative, and they provide the basis for the claims herein which define the scope of the invention.

Figure 1:
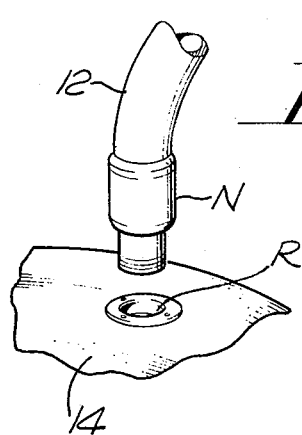
FIG. 1 is a perspective view illustrative of a structure in accordance herewith.

Referring initially to FIG. 1, there is shown a nozzle N indicated to be somewhat aligned with a receptacle R. The nozzle N is connected to a hose 12 while the receptacle R is affixed in a tank 14. Of course, in different applications, the nozzle N and the receptacle R may be variously utilized. As depicted in FIG. 1, the nozzle N is connected through the hose 12 to a reservoir tank (not shown) containing fluid with a pressure head at the hose 12. The receptacle R is affixed in the tank 14 for mating engagement with the nozzle N so that fluid may be received through a closed coupling when the nozzle N is mated with the receptacle R.

In a simple embodiment of the present invention, the nozzle N is mated to the receptacle R simply by forcing the nozzle into the receptacle. In that regard, the nozzle need not be revolved or otherwise actuated but is simply forcibly entered, then held in position to accomplish the closed coupling. Upon releasing the nozzle N, it withdraws (under spring force) from the receptacle R, automatically closing a valve therein to halt any further flow of fluid. It is important to recognize that the nozzle N is automatically closed (and remains closed) unless and until it is matingly received in a receptacle as the receptacle R.

Figure 2:
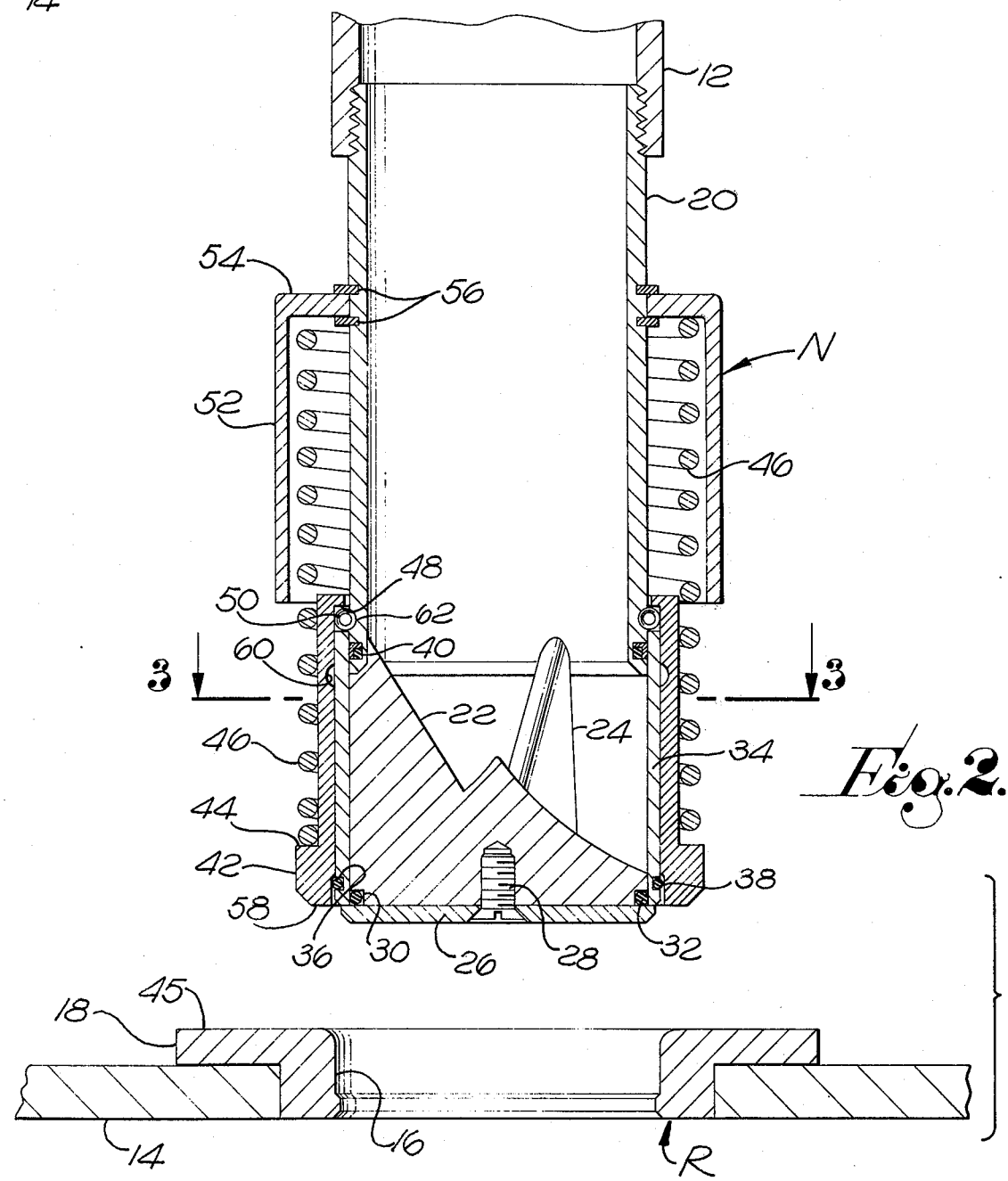
FIG. 2 is a fragmentary sectional view taken centrally through the elements of FIG. 1.

Considering the structure in somewhat greater detail, reference will now be made to FIG. 2 showing a central-axis section through the nozzle N as well as the receptacle R. In the embodiment of FIG. 2, the receptacle R may take an exceedingly-simple form defining a port 16 and including a flange 18 for mounting on the tank 14. The port 16 may define simply a flat cylindrical internal surface with the consequence that no mechanical interlocking is necessary between the receptacle R and the nozzle N.

Figure 3:
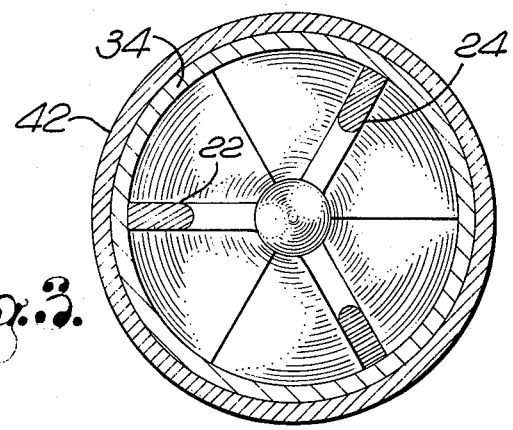
FIG. 3 is a sectional view taken along line 3—3 of FIG. 2.

The hose 12 (FIG. 2 right) is affixed upon a central cylinder 20 in the nozzle N, which cylinder is rigidly affixed to a closure 22 by stream-separating risers 24 (FIG. 3) which radiate from a central point and are spaced apart by 120°. A protector disk 26 is affixed to the external circular end of the closure 22 by a screw 28 so as to protect the flat surface of the closure 22 and to retain an element as disclosed below. An annular groove 30, provided between the closure 22 and the disk 26 receives an O-ring seal 32 to provide a sealing engagement between the closure 22 and a cylindrical sealing tube 34 held by the disk 26 in the cylinder 20. The sealing tube 34 defines an external annular groove 36 adjacent the disk 26 (when closed) for containing an O-ring 38 for sealing engagement with the port 16 in the receptacle R. Another seal, which may comprise an "L-ring" 40 is provided at the rear of the sealing tube 34 for closing any existing passage between the sealing tube 34 and the cylinder 20.

The sealing tube 34 is telescopically received within a sequence ring 42. At the lower or forward end (adjacent the disk 26) the sequence ring 42 carries a flange to define an external rearward shoulder 44 for abutting a coil spring 46. At the upper or rear end of the sequence ring 42, an internal flange is provided to define a forward internal annular shoulder 48 so that a garter spring 50 is confined between the shoulder 48 and the annular end surface of the sealing tube 34. The coil spring 46 extends from the shoulder 44 rearward into a cylindrical cover 52, the rear end of which defines an internal flange 54 which is locked to the cylinder 20 by snap rings 56.

In the production of the embodiment of FIG. 2, a number of considerations are noteworthy. Specifically, it is evident that several of the component parts may be formed of inexpensive material, e.g. plastic. For example, the cover 52, the sequence ring 42 and the disk 26 may all be formed of plastic, even in relatively high-quality structures. In various applications, other component parts may also be formed of inexpensive material; however, it is noteworthy that in embodiments in which the remaining components are formed of metal, each is relatively inexpensive to produce. consequently, the embodiment of FIG. 1 not only affords considerable latitude in defining a very simple receptacle R, but additionally enables a simple and thus inexpensive nozzle N.

In the operation of the embodiment of FIG. 2, as indicated above, fluid under pressure is provided in the hose 12. Upon inserting the nozzle N into the receptacle R, the closure 22 (previously locked in place) opens permitting the flow of fluid through the hose 12 into the tank 14. Upon withdrawing the nozzle N, or simply releasing it, the passage is again closed and locked thereby avoiding the discharge of fluid external of the receptacle R.

Considering the operation of the structure in somewhat greater detail, prior to insertion, the nozzle N simply is held manually at the cover 52 and aligned (without indexing) with the receptacle R. Next, by forceful engagement, the forward end 58 of the sequence ring 42 contacts the flat facing surface 45 of the receptacle R with the result that the spring 46 is compressed slightly as the sequence ring 42 withdraws allowing the O-ring 38 to sealingly engage the cylindrical surface of the port 16. It is to be noted that prior to withdrawal of the sequence ring 42, the garter spring 50 prevents the sealing tube 34 from any movement which would open a passage around the closure 22.

Upon withdrawal of the sequence ring 42 from the O-ring seal 38, the garter spring 50 is received in an annular indentation 60 provided in the inner wall of the sequence ring 42 and accordingly, then moves out of an opposed indentation 62 in the cylinder 20. As a consequence, the cylinder 20 may move forward (down) in relation to the sealing tube 34 carrying the closure 22 to open radially extending passages defined by the risers 24. During such telescopic movement within the nozzle N, the L-seal 40 prevents any leakage of fluid between the sealing tube 34 and the cylinder 20.

By maintaining a grasp on the cover 52, additional force is applied to move the closure 22 out of the sealing tube 34 to a fully-extended position. Thus, the spring 46 is almost fully compressed. With the nozzle N in such a configuration, fluid from the hose 12 flows through the interior of the nozzle N and is directed into three somewhat-radial sreams by the risers 24. The flow continues so long as the nozzle is engaged and fluid is supplied.

Upon the release of the nozzle N (or its withdrawal) the spring 46 forces the closure 22 back into sealing relationship with the sealing tube 34 then acts on the sequence ring 42 to withdraw the nozzle N. Specifically, as the spring 46 is released, the garter spring 50 (dwelling in indentation 60) holds the sealing tube 34 against withdrawal from the receptacle R until the closure 22 has returned to a position in sealed relationship with the sealing tube 34. At such a position, the garter spring 50 may move from the indentation 60 into the indentation 62 (as pictured) with the result that the sealing tube 34 along with the closure 22 may then move telescopically within the sequence ring 42. As a consequence, the nozzle is returned to the state in which it is illustrated with the result that the closure 22 is locked against motion by the sequence ring 42.

From the above considerations it may be seen that the system of FIG. 2 affords a very simple yet effective nozzle and valve combination for use in cooperation with a simple port to sealingly engage the port and discharge fluid into a receptacle. No mechanical interlock is required between the nozzle and valve. Additionally, the nozzle structure is effectively locked closed until it is inserted in the receptacle and additionally automatically opens and closes during the course of being inserted and withdrawn.

In some applications, the need arises for still additional specific features to those present in the embodiment of FIG. 2. For example, it has been determined to be desirable in some applications to lock the nozzle into engagement with the receptacle R. Additionally, as explained in detail below, certain applications exist for a unit incorporating an automatic release to disengage the nozzle, as when a tank is filled. Additionally, in certain applications it becomes important to provide a vent passage through the nozzle N and the hose 12.

Considering a specific exemplary application, a nozzle for fueling a vehicle could include self locking, automatic shut off and vent passages. Accordingly, as fuel passed the vehicle, gaseous vapors could flow from the vehicle tank, back to the supply tank, thereby avoiding the release of such vapors to contaminate the atmosphere. With regard to the locking feature, the nozzle would desirably function in such a manner that it would be locked closed unless or until it were inserted into a mating receptacle. As a related consideration, indexing is generally to be avoided as a complication in mating members together. Finally, as indicated, the structure might desirably incorporate an automatic release, which would operate upon sensing that the fuel tank of the vehicle had been filled. Generally, these considerations are embodied in an exemplary form of the present invention as illustrated in FIG. 4 and which will now be considered in detail.

Figure 4:
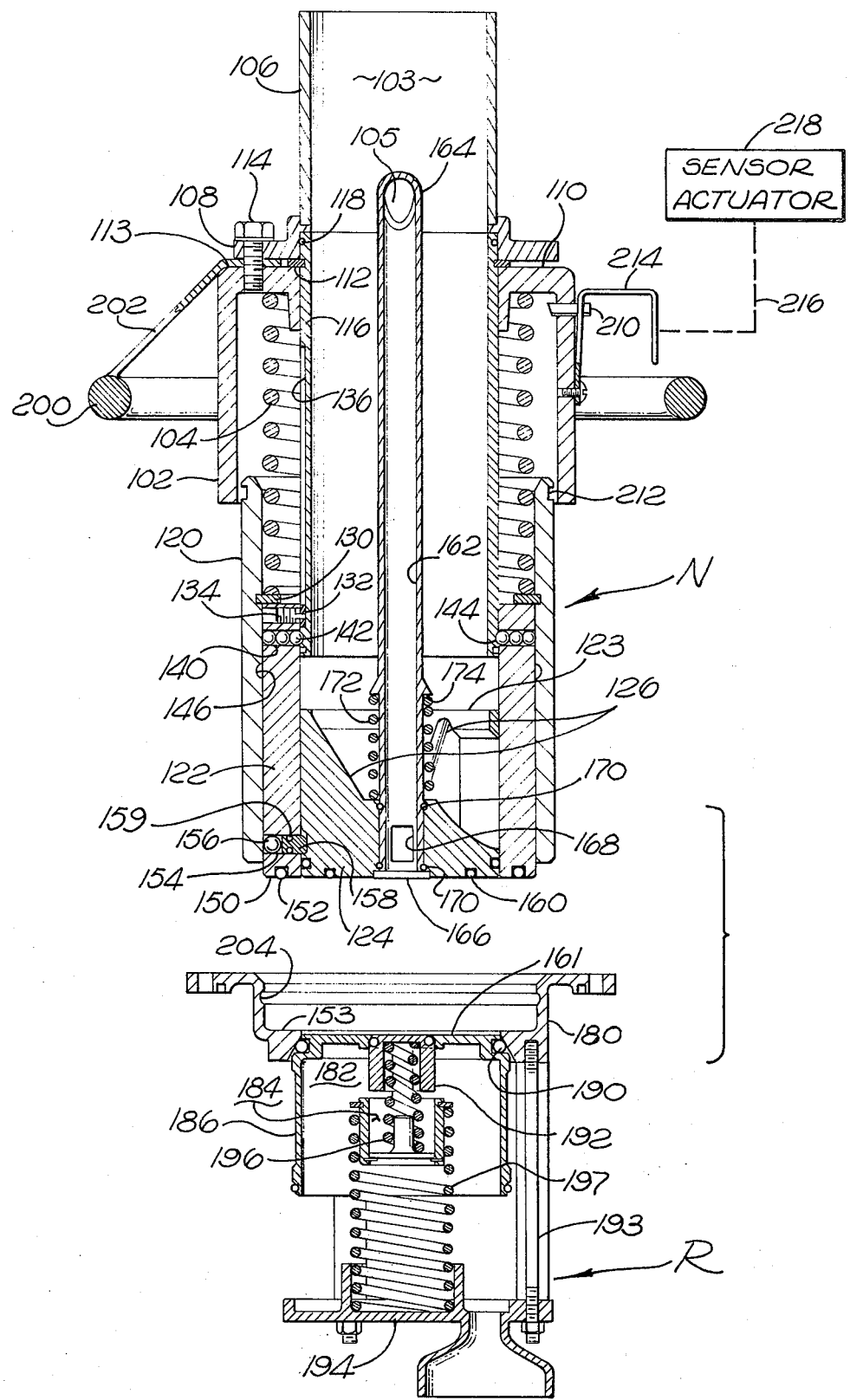
FIG. 4 is a view similar to FIG. 2 illustrating an alternative structure embodying the present invention.

Preliminarily, it is to be noted that the nozzle N of FIG. 4 incorporates an operating philosophy that is generally similar to that characterized by the simpler structure of FIG. 2. A cover 102 at the rear (top) of the nozzle N is provided concentrically over a coil spring 104 and is affixed to a hose coupling 106 which rigidly defines passages 103 and 105. The hose coupling incorporates a rigid flange 108 which is spaced apart from the rear or upper end 110 of the cover 102 by a snap ring 112 and a handle section 113 (described below), the flange 108 and the cover 102 being fixed together by studs 114. A fluid-flow tube or cylinder 116 is concentrically mounted within the cover 102 in alignment with the coupling 106. The cylinder 116 is locked in position as a result of receiving the snap ring 112 in an external annular groove. An O-ring seal 118 then closes the cylinder 116 in relation to the coupling 106. Thus, the cover 102 along with the cylinder 116 and the hose coupling 106 are fixed together and all move forward in telescopic relationship with the forward or lower portion of the nozzle, in the course of engaging a receptacle (illustrated separately).

The cover 102 telescopically receives a sequence ring 120, which in turn telescopically receives a sealing tube 122, the forward end of which matingly receives an end closure 124. The rear surface of the closure 124 is tapered to define three risers 126 as previously disclosed with reference to FIG. 2, for diverting the fluid stream radially when the closure 124 is forced from the sealing tube 122. The upper ends of the risers 126 are integral with a ring 123 which is aligned with the cylinder 116. The sequence ring 120 (outside the spring 104) receives a snap ring 130 in an internal annular groove which abuts the rear end of the sealing tube 122. At angularly-offset locations, adjacent the snap ring 130, the sealing tube 122 supports dogs 132 that are held in place by set screws 134, for alignment with a groove 136 in the cylinder 116. Forward of the dogs 132, the sealing tube 122 defines a plurality of radially extending bores 140 each of which contains a set 142 of sequence balls. In the position illustrated, the sequence balls engage an externally-facing annular indentation 144 in the cylinder 116 thereby locking the sealing tube 122 to the cylinder 116. That locking relationship is released upon rearward movement of the sequence ring 120 so that an internally facing annular indentation 146 therein is positioned to receive the ball sets 142.

At the forward end 150 of the sealing tube 122, an O-ring seal 152 is provided for mating engagement with a flat annular surface 153 in the receptacle R as will be described in greater detail below. Immediately behind the seal 152 are a plurality (e.g. three) of radially-extending bores 154 defined in the sealing tube 122 and each containing a ball 156 and a latching plunger 158. Each latching plunger 158 incorporates an O-ring 159 seal to prevent the flow of fluid through the bores 154. A garter spring could also serve.

Recapitulating, the forward end of the nozzle N incorporates a seal 152 for closing the sealing tube to a mating surface so as to provide a closed passage for the flow of fluid, e.g. liquid fuel. Concentrically within the annular seal 152 is another seal 160 for mating with a surface 161 in the receptacle R so that a closed internal venting passage may be established. In such a structure, gaseous venting fumes pass through the coupling rather than to be discharged into the atmosphere. Considering the venting structure specifically, concentrically within the nozzle N there is located a vent tube 162 extending from a rigid vent line connection 164 (rear of the nozzle) to a closed end 166 at the forward end of the nozzle N illustrated in flush relationship with the end of the closure 124. The forward end of the tube 162 defines radial ports 168 which are located between O-ring seals 170. The portion of the vent tube 162 immediately behind the closure 124 carries a concentric coil spring 172 the rear end of which is supported by an annular shoulder 174 defined to extend from the tube 162. In addition to the sliding support provided the tube 162 by its passage through the closure 124, the tube 162 is also supported at the connection 164.

In considering the operation of the nozzle N of FIG. 4, reference will also be made to a mating receptacle R as depicted. Of course, various forms of receptacles may be employed; however, in the event that multiple passages for fluid and venting are to be used, the receptacle R must be constructed to accommodate such flow patterns. Generally, the receptacle R incorporates a flanged orifice member 180 which supports separate valve structures 182 and 184 for fluid flow and venting flow, respectively. Specifically, the fluid valve 182 incorporates a piston 186 which closes against the member 180 with an O-ring seal 190. Concentrically, within the piston 186, the valve structure 184 incorporates a piston 192 to close a central port in the piston 186. Both the pistons 186 and 192 are mounted within a frame 193 and are urged to closed positions by coil springs 196 and 197, respectively.

Essentially, in the operation of the coupling, as the nozzle N enters the receptacle R, the venting piston 192 yields to open a venting passage and thereafter the piston 186 yields to open the fluid-flow passage. As disclosed in detail below, these passages are opened as a result of sealing engagement between the nozzle N and the receptacle R. In view of the above preliminary description of the coupling as illustrated in FIG. 4, a complete understanding thereof may now be best accomplished by considering a sequence of operation in which the nozzle N and receptacle R are first mated and subsequently separated. Accordingly, assume that the two units are aligned as illustrated and the nozzle N is urged forwardly to accomplish engagement. In that regard, it is to be noted that a handle ring 200 is affixed by legs 202, rigidly to the cover 102 for each in manually engaging and disengaging the coupling elements.

In the initial movement for inserting the nozzle N into the receptacle R, the sequence ring 120 is forced rearward (upward as depicted) by engagement with the flange of the member 180. As a consequence, the sealing tube 122 along with the closure 124 move into the orifice defined by the member 180. In the course of such movement, the balls 156 are exposed and are free to drop into an annular groove 204, for locking the nozzle N in the receptacle R. In the course of moving rearward, to expose the balls 156, the sequence ring 120 is positioned so that sets 142 of balls may drop into the annular groove 146. As a consequence, the central components of the nozzle, including the vent tube 162 and the closure 124, are unlocked from the sealing ring 122 permitting free forward movement in relation thereto.

As the nozzle N is urged further into the receptacle R, the cylinder 116 and the vent tube 162 move forward closing the space between the cylinder and the closure 124. In the course of such movement, the vent tube 162 moves to extend from the closure 124 displacing the piston 192 to accomplish a mating relationship with the valve structure 184. Further motion in mating the nozzle N with the receptacle R results in the cylinder 116 engaging the ring 123 and forcing the closure 124 out of the sealing tube 122. In the course of such movement, the closure 124 abuts the piston 186 and forces it to open the valve structure 182 as the spring 197 yields.

In relation to the motion of the closure 124 out of the sealing tube 122, it is to be noted that the balls 156 are displaced outwardly as the latch plungers 158 are forced from the closure 124. As a consequence, the balls 156 are locked in the annular groove 204 defined in the receptacle R.

With further forward movement of the cover 102 (extending the closure 124) a latch 210 (upper left) is finally aligned with a detent 212 in the sequence ring 120. The latch 210 is carried upon a leaf spring 214 that is affixed to the cover 102 and, accordingly, the latch engages the detent locking the nozzle N in mated engagement with the receptacle R. As a consequence, fuel or other fluid, may flow freely through the coupled elements which also accommodate the passage of gaseous fumes by venting the tank that is being filled to the tank from which fluid is flowing. Thus, an effective coupling is provided as for use in refilling fuel tanks, in which coupling is exceedingly simple.

The latch 210 (upper left) as indicated by a dashed line 216 is connected to an automatic sensing actuator 218, various forms of which are well known in the prior art. Functionally, actuators satisfactory for use as the actuator 218 sense a pressure differential indicating that a tank is substantially full. The actuator 218 operates to withdraw the latch 210 upon the sensing of such a pressure differential and, accordingly, initiates disengagement of the nozzle N from the receptacle R. Upon withdrawal of the latch 210, the spring 104 urges the cover rearward (upward) thereby drawing the associated structure (including the vent tube 162) out of the receptacle R. Specifically, as the vent tube 162 is withdrawn from the valve structure 184, the vent valve in the receptacle R is closed.

When the tube 162 is drawn back to a position in which the end 166 is flush with the closure 124, the closure 124 is drawn from the valve structure 182 in the receptacle R to be returned to the sealing tube 122. Upon the closure 124 being received in the sealing tube 122 (as depicted in FIG. 4) the plungers 158 move internally allowing the balls 156 to become disengaged from the groove 204 in the receptacle R. The withdrawal results in closure of all four valves. If desired, a flange on the receptacle, or an elongation of the nozzle, may retain the disengaged nozzle in proximity to the receptacle. In any event upon manual removal of the nozzle N from the receptacle R, the annular indentation 144 in the cylinder 116 is positioned to receive the sets 142 of balls so that the sealing tube 122 becomes locked to the cylinder 116 as the sequence ring 120 moves back to the position illustrated in FIG. 4.

It is to be noted that the nozzle of the present invention is locked closed by the sequence structure until the sequence structure is displaced as a result of engagement with a mating receptacle. Should the nozzle and receptacle become disengaged, closure is effected to avoid spilling any of the fuel or other fluid in transfer. The simplicity of structures embodying the present invention coupled with the possibility of employing a very simple receptacle structure is also an important consideration. Finally, the utilization of structures in accordance herewith incorporating vent ducts and automatic disengaging structures also afford distinct advantages for the present invention. Of course, the invention may be embodied in a wide variety of different structural embodiments with the consequence that the scope hereof is deemed to be in accordance with the following claims.

What is claimed is:

1. A fluid coupling member, as for use on a hose for passing a fluid stream through said hose to a port in a receptacle, comprising:
   a central cylinder adapted to be connected to a terminal end of a hose;
   an end closure means affixed in axially-aligned, spaced-apart relationship to said central cylinder, defining radial open space therebetween;
   a sealing member of cylindrical configuration disposed concentrically with said central cylinder for movement between one position to close said open space and another position telescoped over said central cylinder;
   bias means for urging said sealing member to said one position to close said open space;
   a sequence ring telescopically positioned over said sealing member; and
   an engaging mechanism controlled by the position of said sequence ring including a locking means for locking said sealing member in said one position until said sequence ring is displaced by engagement with a port in a receptacle, and thereupon for locking said sealing member for movement with said sequence ring in relation to said central cylinder whereby said radial open spaced is opened.

2. A fluid coupling member according to claim 1 wherein said bias means comprises a coil spring concentrically disposed over said central cylinder.

3. A fluid coupling member according to claim 1 wherein said locking means includes a garter spring positioned for contact with said central cylinder, said sealing member and said sequence ring.

4. A fluid coupling member according to claim 1 wherein said end closure means and said central cylinder define therebetween a plurality of passages to comprise said open space.

* * * * *